Figure 1:
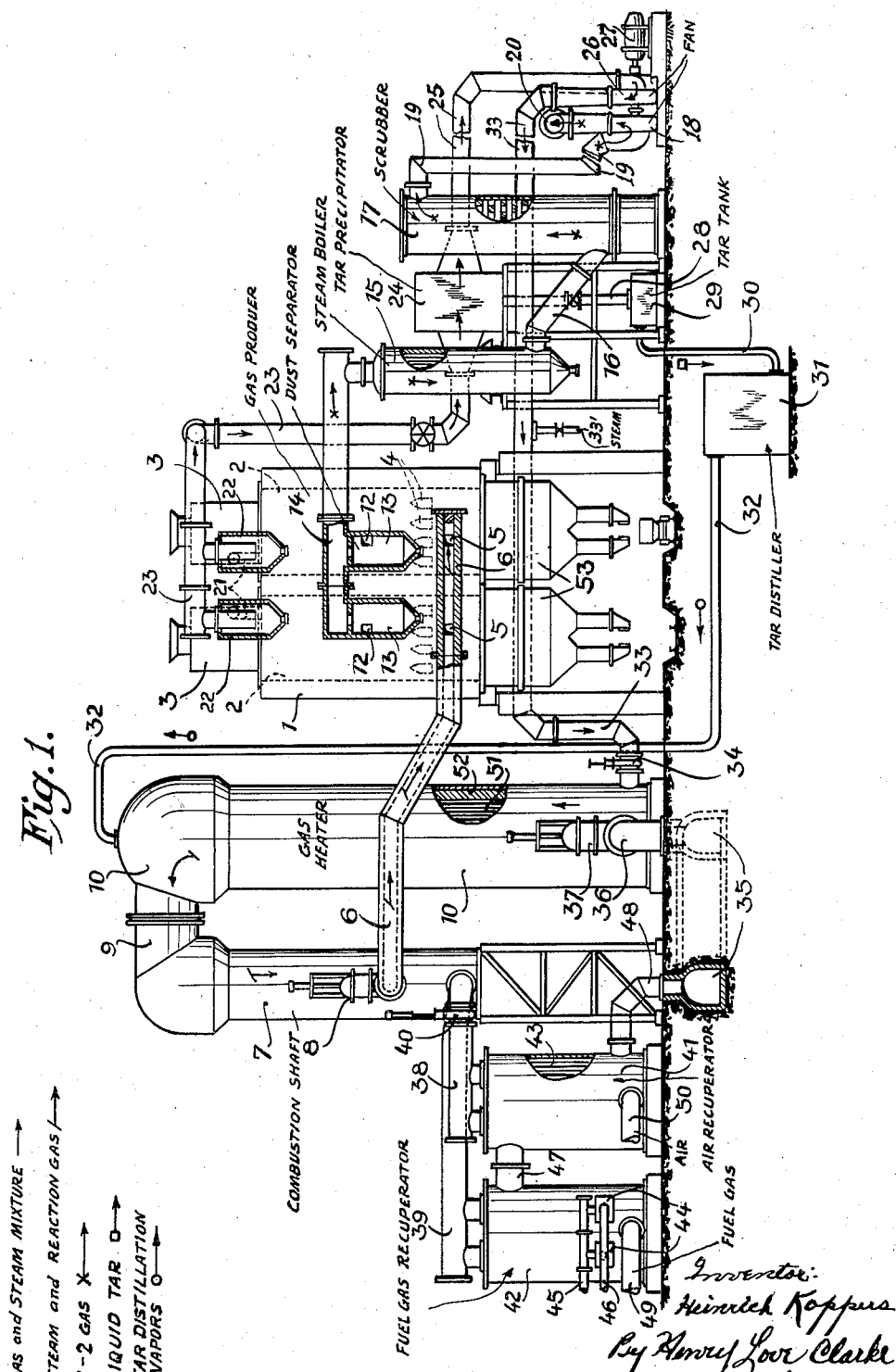

Patented Oct. 11, 1938

2,132,533

UNITED STATES PATENT OFFICE 2,132,533

PRODUCTION OF GAS SUITABLE FOR THE SYNTHESIS OF HYDROCARBONS FROM CARBON MONOXIDE AND HYDROGEN

Heinrich Koppers, Essen, Germany, assignor, by mesne assignments, to Koppers Company, Pittsburgh, Pa., a corporation of Delaware Application September 3, 1936, Serial No. 99,327
In Germany September 6, 1935

2 Claims. (Cl. 23—212)

The invention relates to the production of gases, suitable for the catalytical synthesis of hydrocarbons, for instance motor fuel, from carbon monoxide and hydrogen and especially to such a process for producing said gases, which work continuously, so that a continuous stream of useful gases may be obtained.

In the catalytical synthesis of hydrocarbons, for instance by the process of Professor Dr. Fischer and collaborators, a gas mixture is treated which consists essentially of carbon monoxide and hydrogen, preferably in a ratio of 1:2, besides some unavoidable inerts. Such a gas mixture is brought into contact with catalysts, such as finely divided cobalt or nickel compounds, at normal or slightly increased pressure, whereby hydrocarbons are formed and water is split-off.

In my co-pending application, relating to the "Continuous production of water gas", executed May 29th, 1936, Serial Number 84,398, filed June 10, 1936. I disclosed a new and useful process for the production of water-gas from reactive fuels, for instance brown coal, lignite or other bituminous, non-caking coals or fuel.

My former process provides for a continuous stream of water-gas and steam, which in one stage of the process is heated-up to a high temperature and in a second stage is brought into contact with the carbonaceous material to be treated, whereby the steam reacts with the carbon, forming water-gas, i. e., a mixture of carbon monoxide and hydrogen with some inerts.

The principal object of my present invention is to provide such improvements in my former developed process, corresponding to my said co-pending application, which permits a higher yield of useful gases, suitable for the synthesis of hydrocarbons, and containing a high percentage of hydrogen, so that the ratio of carbon monoxide to hydrogen in the gas mixture is 1:2 or nearly 1:2.

My present invention follows the principle of converting as much hydrogen as possible contained in the fuel to be treated, for instance bituminous substances, into elementary hydrogen, so that as much carbon of the fuel as possible may be consumed for the production of carbon monoxides, and therefore a high efficiency of the process, regarding the fuel consumption, may be obtained. In other words, according to my invention I transform the fuel including its bituminous matters, as far as possible into carbon monoxide and elementary hydrogen, these two substances being the basis for the production of well defined hydrocarbons, whilst the recovery of bituminous matters of the fuel in the usual form of tar and distillation oils is reduced or wholly omitted.

The process according to my present invention consists essentially in that preferably reactive fuels, such as brown coal or lignite coal or any other suitable bituminous fuel are treated in a cycle with a mixture of steam and water-gas, said mixture being heated at one stage of the cycle to such a temperature, at which hydrocarbons will decompose and interact with steam, and in a second stage the hot gas mixture is brought into contact with the fuel to be treated, the gases thus produced being returned wholly or partly to the heating stage of the process at a temperature above the dew point, with regard to water and tarry matters, steam being added to said gas, if necessary, before it enters the heating stage.

Furthermore, my invention provides for substances removed from the circulating gases, such as tarry matters, being in the form of mist and dust, to be treated in such a manner, that hydrocarbons contained in such residuals may be wholly or partly added to the circulating gases before they enter the heating stage of the process. This feature of my present invention is insofar advantageous, as it permits to use also the hydrocarbon contents of the tarry matters, removed from the gases for the production of elementary hydrogen, useful for producing water-gas with a defined ratio of carbon monoxide and hydrogen.

Still further objects of my present invention may be taken from the following description of a preferred embodiment of my invention, which I will explain in particular on the lines of the accompanying drawings.

Figure 2:
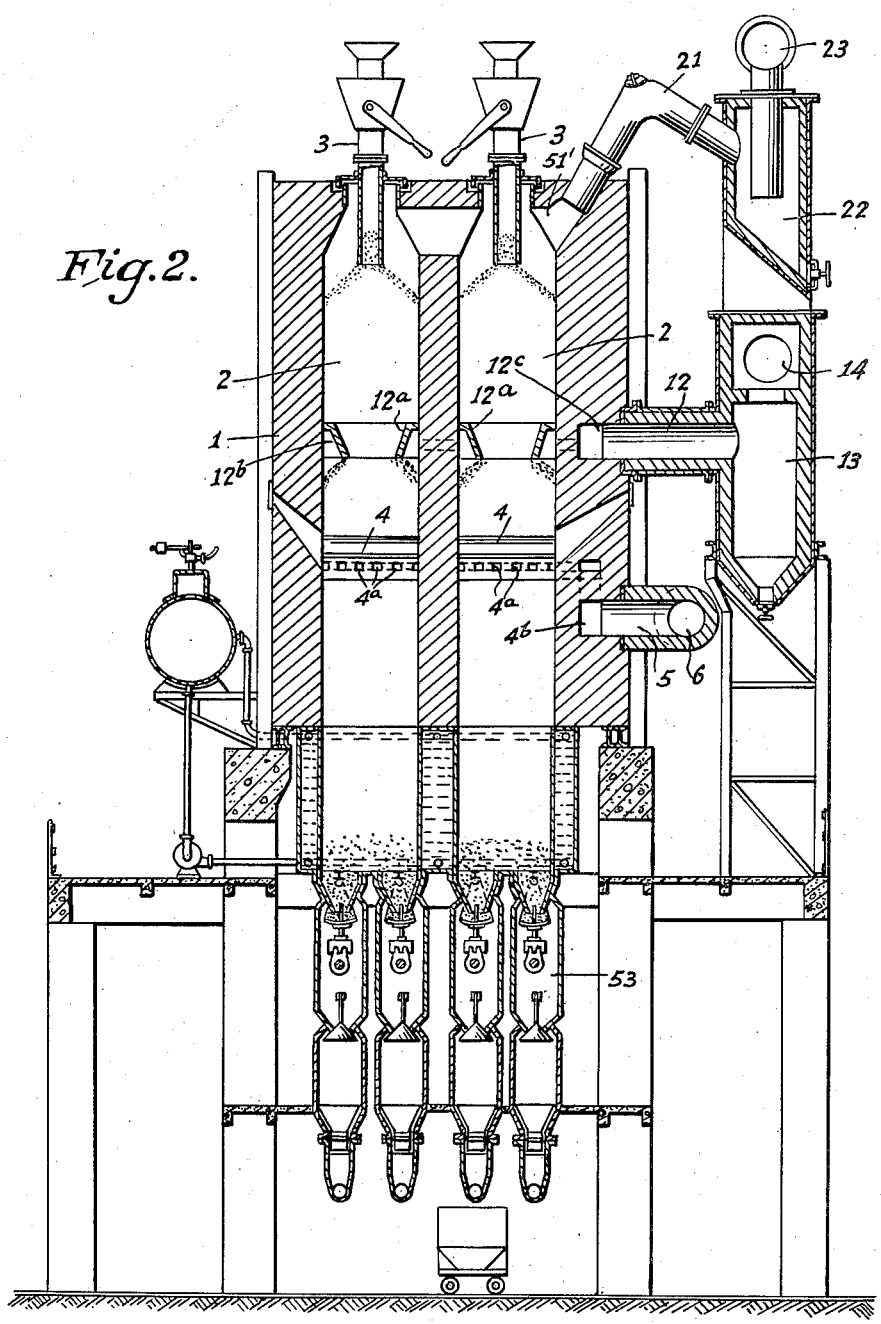

On the drawings, Fig. 1 shows a side view and partly a vertical section through a plant for the continuous production of water-gas, and Fig. 2 shows the internal construction of the gas producer in more detail.

In the plant as shown in the drawings, a gas producer 1 serves for receiving the fuel to be gasified. Preferably a so-called easily reactive fuel shall be used, for instance brown coal, lignite, bituminous non-caking coal, wood, shells of coconuts or any other suitable fuel containing carbon. In gas producer 1, the fuel is brought into contact with a highly heated mixture consisting of water-gas and steam. The hot gas-steam-mixture thus transfers heat to the fuel and warms it up to such a high temperature, that by the reaction of the steam with carbon, hydrogen and carbon monoxide, i. e., water-gas, are formed.

The design of the plant may be the same as described in my aforesaid co-pending application, executed May 29th, 1936, Serial Number 84,398.

The gas producer 1 consists of two rectangular shafts or chambers 2, which are constructed of refractory brickwork. In the ceiling of the gas producer are arranged suitable fuel feeders 3. The contrivance 3 may be essentially of similar design as the well-known charging contrivances for gas producers.

Inside the gas producer 1 there are provided a row of bridges 4, made of refractory material. In Fig. 1 of the drawings, these bridges 4 have been shown in dashed lines. The bridges 4 have the shape of cutters at the top.

Inside the bridges 4 there are provided longitudinal channels, which are in connection with the producer interior through parts 4$^a$. All the longitudinal channels or a group of same of the bridges 4 run into wall channels 4$^b$, which are arranged in the one or in both side walls of the gas producer. From the wall channels 4$^b$ there lead several channels 5, or only one channel to the outside. The channel 5 is connected with a pipeline 6, lined with refractory materials. As may be seen from the drawings, the pipeline 6 extends over the whole length of the gas producer 1. The pipeline 6 leads to a vertical combustion shaft 7, made of refractory material. The connection of the pipeline 6 with the shaft 7 can be interrupted by a valve 8 or another suitable closing agent, which is able to withstand high temperatures. At the upper end at point 9 the shaft 7 is in connection with the upper end of a tower-like gas heater 10, designed essentially like the well-known Cowpers used for heating air in the blast-furnace process. An annular wall projection 12$^a$ is provided above the bridges 4 in the gas producer, the cavity 12$^b$ of the projection being connected with a wall-channel 12$^c$, which is connected by channels 12 with dust separators 13. The gases contain often large quantities of dust, which have to be removed before the gas can be further treated. The dust precipitating in the dust separators 13 is discharged at the bottom of the separating chambers. A pipeline 14 leads from the dust separators to the steam boiler 15, or to another suitable heat exchanger, in which the hot gases give off their heat. From the contrivance 15 the cooled gases pass through the pipeline 16 to a scrubber 17, in which the gases are treated with hot and/or cold water and are thus freed from the last traces of dust and other impurities. The contrivance 17 is in connection with a gas exhauster or fan 18, by means of the pipeline 19. From the exhauster 18 the purified and cooled gas can be drawn off through the pipeline 20 for further use.

In the ceiling of the gas producer, an opening 51' is arranged for, through which the gases formed in the upper part of the gas producer can escape. A pipeline 21 is connected to said gas outlets, which pipeline leads to a dust-separator 22. From the dust separator 22 a pipeline 23 leads to a tar removal arrangement 24, for instance to an electrostatic tar precipitator. The pipeline 23 and the dust separator 22 are preferably lined with an heat insulating material, so that the gases cannot be cooled down there. From the tar precipitator 24 a pipeline 25 leads to the gas exhauster or fan 26. This gas exhauster 26 is suitably directly coupled with the gas exhauster, so that both gas exhausters can be driven by one motor 27.

The temperatures of the gases passing the outlets, arranged in the upper part of the gas producer, may be above 100°, preferably 120–140° C., i. e., well above the dew point for water and light oils. The temperature of all other apparatus provided for in the gas cycle may be as high as the gas temperature in the said outlets, so that no condensation of steam or oils may occur.

The tar or other constituents from the gas precipitating in the tar removal arrangement 24 can be drawn off through the closable pipeline 28. The pipeline 28 leads to a settling tank 29, in which tar is separated from viscous matters. The liquid tar is removed from the tank 29 through pipeline 30 to a distilling apparatus 31, for instance a pipe-still arrangement. The distilling vapours and gases, developed when distilling the tar in the arrangement 31, are conducted through pipe line 32 to the dome-like roof of the gas heater 10. Here the vapours or gases are mixed with highly heated steam and reaction gases, and hydrocarbons are thus transformed into hydrogen, carbon-monoxide and, as the case may be, some elementary carbon in finely divided state. The residuals from the settling tank 29 and from the distilling apparatus 31 are charged into the fuel feeder 3 and are thus again treated in the gas heater, whereby further carbon compounds are decomposed.

A pipeline 33 leads from the gas exhauster 26 to the lower end of the gas heater 10, and interposed in the line is a gas valve 34. The lower end of the gas heater 10 is also connected with the waste gas flue 35, by means of a pipeline 36, governed by the shut-off valve 37, which flue leads to a chimney not shown on the drawings.

At the lower end of the shaft 7 there are connected pipelines 38 and 39, each of which includes a shut-off valve 40. The pipeline 38 leads to an arrangement 41 and the pipeline 39 runs to an arrangement 42. The arrangements 41 and 42 are recuperators. They serve for preheating the air and if necessary also fuel gas for combustion in shaft 7. In the inside of the recuperators 41 and 42 there are provided a number of vertical tubes 43, which are traversed by the medium to be preheated.

The contrivance 42 is equipped with gas-air burners, 44, which are supplied with fuel-gas and air, by the pipeline 45 and 46.

The hot combustion gases leaving the burner 44 flow along the outside of the pipes 43 of the contrivances 42, and a part of their heat is transferred through the pipeline 43 and thus to the medium (fuel gas) flowing through these pipes to conduit 39. From the upper end of the recuperator 42 the hot combustion gases flow through the connecting line 47 to the upper end of the recuperator 41, which similarly to the recuperator 42 is fitted inside with tubes 43. The hot combustion gases transfer the rest of the useful heat, etc., air flowing through the contrivance 41 to conduit 38, and finally flow through the pipeline 48 to the channel 35. The recuperator 42 is supplied with fuel gas through the pipeline 49 and the recuperator 41 is supplied with air through the pipeline 50.

The method of operating the plant as shown, is about the following:—It is assumed, that all parts of the gas producing plant are heated up to the working temperature, the gas valve 40 at the foot of the shaft 7 may be opened. Preheated air and fuel gas then flow from 38 to 39 into the shaft 7 at the bottom. The gas valve 8 is closed in this working period, likewise the valve 34. The valve 37 of the gas heater 10 is, however, open. The media introduced into the shaft 7 are burnt there. The hot gases pass through the connecting line 9 into the gas heater 10 and they give their heat to the refractory checker-work 51, which similarly to a known Cowper stove is surrounded by a refractory brick lining 52.

As soon as the refractory checkerwork 51 of the gas heater 10 has been brought to the desired temperature, at which hydrocarbons decompose, for instance up to 1250° C., the gas valves 40 and 37 are closed and the valves 8 and 34 are opened. By means of the blower 26 through the pipeline 33 a mixture of water-gas and steam is now introduced from below into the gas heater 10. The gas-steam mixture is warmed-up at the hot checkerwork of the gas heater, for instance to a temperature of about 1150–1200° C. The mixture then flows through the connection 9 into the shaft 7, passes downwards and then goes through the opened pipeline 6 into the channels 5 and into the longitudinal channels to the ports 4ª of the bridges 4. From these ports 4ª the hot steam-gas mixture flows into the fuel charge of the gas producer chamber 2. The hot gas-steam mixture gives off its heat to the fuel, whereby by the conversion of the steam with carbon there is formed water-gas. The temperature inside the fuel charge of the gas producer 1 may be about 1000–1100° C., just above the bridges 4. A part of the formed water-gas is now removed through the cavity 12ᵇ and the channels 12ᶜ, provided in the annular wall projection above bridges 4 of the gas producer 1, to the channel 12. This part of the gas then flows through the dust separator 13 and pipe 14 to the steam boiler 15. From there the gas passes to the scrubber 17. The purified and cooled gas can finally be discharged through the pipeline 20 as useful 1:2 gas.

The remaining gas formed in the lower part of the gasification chambers 2 or which has been introduced there into the chambers, rises upwards through the fuel. It warms up the fuel which is thereby distilled. The mixture of water-gas, distilling gas and steam is drawn off through the pipelines 21 at the ceiling of the gas producer, at a temperature of about 120° C. The openings of the pipelines 21 are situated above the top layer of the fuel, so that the gases and vapours from the gas producer are essentially drawn off at the temperature inherent to the top layer of the fuel charge.

The gases and vapours then flow through the pipelines 21, the dust separator 22 and the tar precipitator 24. In these contrivances, the dust and tarry constituents contained in the gas only in suspension, are separated, whereas the vapour-like constituents especially hydrocarbon and water-steam are left in the gas. The gas has therefore a temperature which essentially is above the dew point for water-gas.

The gas still hot and charged with steam and hydrocarbons is then delivered by means of the blower 26 through the pipeline 33 into the gas heater. Here it is again heated-up so as to flow afresh into the gas producer 1, and to effect here the water-gas reaction. Under certain circumstances, it is moreover advisable to add a certain quantity of steam to the gas before entering the gas heater 10, as through pipe 33', if the quantity of water formed during the distillation of the fuel is not sufficient for the water-gas reaction. As soon as the temperature of the gas heater 10 has fallen below the point at which the water-gas reaction gradually takes place, the valves 8 and 34 are closed and the gas heater after opening the valves 40 and 37 is again heated-up. Thereafter the former cycle of the furnaces is started, so that water-gas is again formed. Instead of connecting the gas producer 1 with one gas heater only, as shown on the drawings, it is also possible and advantageous to connect the gas producer alternatively with 2 or several gas heaters. In this case a continuous stream of water-gas can be permanently taken from the gas producer as always one of the gas heaters, having a high temperature, is connected with the gas producer.

The hydrocarbons contained in the circulating gas which is introduced into the gas heaters are converted by the interaction with steam in the gas heater or in the lower part of the gas producer, where exists a high temperature, into hydrogen and carbon-monoxides. Consequently, the useful water-gas flowing through the channels of the bridges 4 from the gas producer 1 contains practically no hydrocarbons and consists exclusively of hydrogen and carbon monoxides.

The residue left over from the gasification of the fuel passes through the spaces between the bridges 4 of the gasification chambers 2 and then flows into the discharging shafts 53.

I have now described my present invention on the lines of a preferred embodiment thereof, but my invention is not limited in all its aspects to the mode of carrying it out as above described and shown, since the invention may be variously embodied within the scope of the following claims.

I claim:—

1. In a method for producing water-gas containing carbon monoxide and hydrogen in ratio suitable for catalytical reaction, such as the synthesis of hydrocarbons, from bituminous fuel of the character of brown coal, lignite, bituminous coal and the like, comprising: flowing through and thereby reacting with a bed of the fuel, a heated mixture of steam and water-gas which has been previously heated in a separate heating stage of a cycle to a temperature at which hydrocarbons will decompose and interact with steam; withdrawing part of the gas thus produced from the cycle at a point in the fuel bed where the fuel is substantially free of hydrocarbons; returning the other part of said gases in cycle to said heating stage at a temperature above the dew point of tar and water, after passing through another part of the fuel bed where hydrocarbons are present and flow off with the gas in admixture therewith; removing tarry constituents in suspension from the latter gas portion while leaving the vapor-like hydrocarbons therein, after the gas leaves the fuel bed but before it re-enters the heating stage; the step comprising distilling the so removed tar, and conducting the vapors of distillation therefrom back into the aforesaid heating stage into contact with the gas therein.

2. In a method for producing water-gas containing carbon monoxide and hydrogen in ratio suitable for catalytical reaction, such as the synthesis of hydrocarbons, from bituminous fuel of the character of brown coal, lignite, bituminous coal and the like, comprising: flowing through and thereby reacting with a bed of the fuel, a heated mixture of steam and water-gas which has been previously heated in a separate heating stage of a cycle to a temperature at which hydrocarbons will decompose and interact with steam; withdrawing part of the gas thus produced from the cycle at a point in the fuel bed where the fuel is substantially free of hydrocarbons; returning the other part of said gases in cycle to said heating stage at a temperature above the dew point of tar and water, after passing through another part of the fuel bed where hydrocarbons are present and flow off with the gas in admixture therewith; removing tarry constituents in suspension from the latter gas portion while leaving the vapor-like hydrocarbons therein, after the gas leaves the fuel bed but before it re-enters the heating stage; the steps comprising separating liquid tar from other material removed therewith in the aforesaid tar removal step, distilling the liquid tar, and conducting the vapors of distillation from the distillation step back into the aforesaid heating stage, into contact with the gas therein, and the residue, from the liquid tar separating step and the liquid tar distilling step, back into the fuel bed.

HEINRICH KOPPERS.